United States Patent
Li (10) Patent No.: US 12,067,697 B2
(45) Date of Patent: Aug. 20, 2024

(54) METHOD AND DEVICE FOR CORRECTING IMAGE, ELECTRONIC EQUIPMENT, AND STORAGE MEDIUM

(71) Applicant: BEIJING XIAOMI MOBILE SOFTWARE CO., LTD., Beijing (CN)

(72) Inventor: Qian Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 312 days.

(21) Appl. No.: 17/488,077

(22) Filed: Sep. 28, 2021

(65) Prior Publication Data
US 2022/0309632 A1    Sep. 29, 2022

(30) Foreign Application Priority Data

Mar. 29, 2021  (CN) .......................... 202110334482.4

(51) Int. Cl.
  *G06T 5/50*   (2006.01)
  *G06T 5/70*   (2024.01)
  *H04N 5/262*  (2006.01)

(52) U.S. Cl.
  CPC .................. *G06T 5/50* (2013.01); *G06T 5/70* (2024.01); *H04N 5/2621* (2013.01)

(58) Field of Classification Search
  CPC ........... G06T 5/50; G06T 5/002; G06T 5/006; G06T 5/70; G06T 5/80; H04N 5/2621; H04N 23/81; H04N 25/61
  See application file for complete search history.

(56) References Cited

U.S. PATENT DOCUMENTS

| | | | |
|---|---|---|---|
| 6,937,282 B1 | 8/2005 | Some et al. | |
| 7,719,597 B2 | 5/2010 | Okada et al. | |
| 2005/0213159 A1 | 9/2005 | Okada et al. | |
| 2015/0254818 A1* | 9/2015 | Li | G06T 3/0006 382/275 |
| 2020/0107013 A1* | 4/2020 | Hudman | H04N 13/296 |
| 2021/0044725 A1* | 2/2021 | Powell | H04N 23/54 |

FOREIGN PATENT DOCUMENTS

| CN | 103426149 A | 12/2013 | |
|---|---|---|---|
| CN | 110570367 A | 12/2019 | |
| WO | WO-2010071647 A1 * | 6/2010 | ........... H04N 5/3572 |

OTHER PUBLICATIONS

European Search Report in the European Application No. 21200067.3, mailed on Mar. 17, 2022, (10p).
Gao Xiang et al., "Fourteen lectures on visual SLAM", Publishing House of Electronics Industry, Aug. 2019, (4p).
First Office Action of the CN application No. 202110334482.4 dated May 16, 2024 with English translation, (14p).

* cited by examiner

*Primary Examiner* — Brandon J Miller
(74) *Attorney, Agent, or Firm* — Arch & Lake LLP (57) ABSTRACT

A first image collected by an image collector is acquired. A map generated based on a correspondence between a distortion rate and a field of view of the image collector is acquired. The map includes a mapping relation between a raw pixel coordinate of a pixel in a raw image collected by the image collector and a target pixel coordinate that has been corrected. A second image that has been corrected is acquired by correcting the first image based on the map.

15 Claims, 7 Drawing Sheets

---

S110, a first image collected by an image collector is acquired

↓

S120, a map generated based on a correspondence between a distortion rate and a field of view of the image collector is acquired. The map includes a mapping relation between a raw pixel coordinate of a pixel in a raw image collected by the image collector and a target pixel coordinate that has been corrected

↓

S130, a second image that has been corrected is acquired by correcting the first image based on the map

S210, the correspondence may be acquired. The correspondence may include N discrete field-of-view-to-distortion-rate mapping relations of the image collector. The N may be a positive integer greater than or equal to 2

S220, a Field Distortion (FD) curve may be generated based on an interpolation algorithm and the correspondence. The FD curve may be configured for determining a distortion rate corresponding to a field of view where a raw pixel coordinate in an image collected by the image collector is located S230, the map may be generated based on the FD curve, a first distance, and a second distance. The first distance may be a distance between the raw pixel coordinate and a center of the image. The second distance may be a distance between the target pixel coordinate and the center

METHOD AND DEVICE FOR CORRECTING IMAGE, ELECTRONIC EQUIPMENT, AND STORAGE MEDIUM

CROSS-REFERENCE TO RELATED APPLICATIONS

This application claims the benefit of priority to Chinese Application No. 202110334482.4 filed on Mar. 29, 2021, the disclosure of which are incorporated herein by reference in its entirety for all purposes.

BACKGROUND

Image collection is widely used in a technical field such as traffic, monitoring, photography, etc. However, a camera performing image collection will distort a collected image relative to an object of collection due to a structure of the camera. Particularly, a structural feature of a wide-angle lens worsens such a distortion.

SUMMARY

The present disclosure relates to the field of image technology. Embodiments of the present disclosure provide a method and device for correcting an image, an electronic device, and a storage medium.

According to a first aspect of the present disclosure, there is provided a method for correcting an image. The method includes: acquiring a first image collected by an image collector; acquiring a map generated based on a correspondence between a distortion rate and a field of view of the image collector, the map including a mapping relation between a raw pixel coordinate of a pixel in a raw image collected by the image collector and a target pixel coordinate that has been corrected; and acquiring a second image that has been corrected by correcting the first image based on the map.

According to an aspect of the present disclosure, there is provided an electronic device, including: a memory configured to store processor executable instructions; and a processor connected to the memory. The processor is configured to perform the method provided by any technical solution of the first aspect.

According to an aspect of the present disclosure, there is provided a non-transitory computer-readable storage medium having stored thereon instructions which when executed by a processor of a computer, allow the computer to perform the method provided by any technical solution of the first aspect.

BRIEF DESCRIPTION OF THE DRAWINGS

The accompanying drawings, which are incorporated in and form a part of this specification, illustrate embodiments consistent with the present disclosure and, together with the description, serve to explain the principles of the present disclosure.

DETAILED DESCRIPTION

Reference will now be made in detail to illustrative embodiments, examples of which are illustrated in the accompanying drawings. The following description refers to the accompanying drawings in which the same numbers in different drawings represent the same or similar elements unless otherwise represented. The implementations set forth in the following description of illustrative embodiments do not represent all implementations consistent with the present disclosure. Instead, they are merely examples of devices and methods consistent with aspects related to the present disclosure as recited in the appended claims. The illustrative implementation modes may take on multiple forms, and should not be taken as being limited to examples illustrated herein. Instead, by providing such implementation modes, embodiments herein may become more comprehensive and complete, and comprehensive concept of the illustrative implementation modes may be delivered to those skilled in the art. Implementations set forth in the following illustrative embodiments do not represent all implementations in accordance with the present disclosure. Rather, they are merely examples of the apparatus and method in accordance with certain aspects herein as recited in the accompanying claims.

Note that although a term such as first, second, third may be adopted in an embodiment herein to describe various kinds of information, such information should not be limited to such a term. Such a term is merely for distinguishing information of the same type. For example, without departing from the scope of the embodiments herein, the first information may also be referred to as the second information. Similarly, the second information may also be referred to as the first information. Depending on the context, a "if" as used herein may be interpreted as "when" or "while" or "in response to determining that".

In addition, described characteristics, structures or features may be combined in one or more implementation modes in any proper manner. In the following descriptions, many details are provided to allow a full understanding of embodiments herein. However, those skilled in the art will know that the technical solutions of embodiments herein may be carried out without one or more of the details; alternatively, another method, component, device, option, etc., may be adopted. Under other conditions, no detail of a known structure, method, device, implementation, material or operation may be shown or described to avoid obscuring aspects of embodiments herein.

A block diagram shown in the accompanying drawings may be a functional entity which may not necessarily correspond to a physically or logically independent entity. Such a functional entity may be implemented in form of software, in one or more hardware modules or integrated circuits, or in different networks and/or processor devices and/or microcontroller devices.

A terminal may sometimes be referred to as a smart terminal. The terminal may be a mobile terminal. The terminal may also be referred to as User Equipment (UE), a Mobile Station (MS), etc. A terminal may be equipment or a chip provided that provides a user with a voice and/or data connection, such as handheld equipment, onboard equipment, etc., with a wireless connection function. Examples of a terminal may include a mobile phone, a tablet computer, a notebook computer, a palm computer, a Mobile Internet Device (MID), wearable equipment, Virtual Reality (VR) equipment, Augmented Reality (AR) equipment, a wireless terminal in industrial control, a wireless terminal in unmanned drive, a wireless terminal in remote surgery, a wireless terminal in a smart grid, a wireless terminal in transportation safety, a wireless terminal in smart city, a wireless terminal in smart home, etc.

Related art proposes a method for correcting such a distortion. For example, distortion correction is performed through a polynomial model. On one hand, with the method, a camera has to be calibrated based on a checkerboard, and an internal parameter and an external parameter of the camera have to be acquired, leading to massive lengthy computation. On the other hand, distortion correction through a polynomial model is widely applied. Effect of correction of an image collected in some scenes is not obvious. What's more, more image distortion may be introduced by the correction. In addition, even within a range of use of the polynomial model, effect of image correction may not be ideal.

Figure 1:
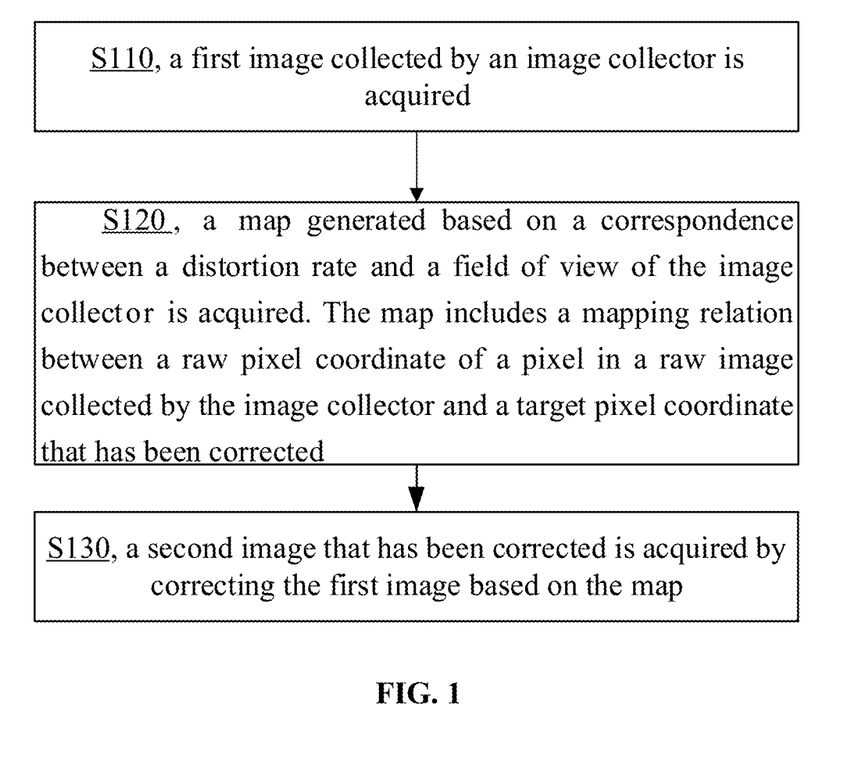
FIG. 1 is a flowchart of a method for correcting an image according to an illustrative embodiment.

As shown in FIG. 1, embodiments of the present disclosure provide a method for correcting an image. In one example, the method may include following acts.

In S110, a first image collected by an image collector is acquired. The image collector may include a circuit board with one or more image sensors, memory storage, chips, and other circuit parts.

In S120, a map generated based on a correspondence between a distortion rate and a field of view of the image collector is acquired. The map includes a mapping relation between a raw pixel coordinate of a pixel in a raw image collected by the image collector and a target pixel coordinate that has been corrected.

In S130, a second image that has been corrected is acquired by correcting the first image based on the map.

In embodiments of the present disclosure, the method for correcting an image may be used in various kinds of electronic devices. The electronic devices may include various kinds of terminal equipment as well as servers. The terminal equipment further includes a mobile terminal and/or a fixed terminal. The mobile terminal includes, but is not limited to, a mobile phone, a tablet computer, tablet and notebook two-in-one equipment, an electronic reader, wearable equipment, or on-board equipment, etc.

The image collector may include various types of lenses with an image collecting function, such as a wide-angle lens, a telephoto lens, a 3D lens, a camera, etc.

Illustratively, the image collector may be various types of camera. Illustratively, the image collector may include lens and an image sensor; The lens may conduct light to the image sensor. The image sensor may generate an image.

S110 and S120 do not necessarily take precedence over one another. The map of the image collector may be read while the image collector collects the first image. The map may exist in a configuration file of the image collector, etc. The electronic device may also acquire the first image first, and then acquire the map corresponding to the image collector. The map may also be acquired immediately after the image collector is started, so as to perform image correction on each collected first image based on the map, thereby acquiring a second image quickly.

The map is first generated based on the correspondence between the distortion rate and the field of view of the image collector. The correspondence is illustrated below with examples. As shown in Table 1, Field represents different fields of view, and Distortion represents the distortion rates. FD tables of different lenses are different. Table 1 is but for reference. A computation formula is: Distortion=(Real image height-ideal image height)/ideal image height.

TABLE 1

| field | distortion |
|-------|------------|
| 0.0 | 0.00% |
| 0.1 | 0.21% |
| 0.2 | 0.52% |
| 0.3 | 0.75% |
| 0.4 | 1.06% |
| 0.5 | 1.50% |
| 0.6 | 1.81% |
| 0.7 | 1.86% |
| 0.8 | 1.74% |
| 0.9 | 1.61% |
| 1.0 | 1.58% |

Figure 2:
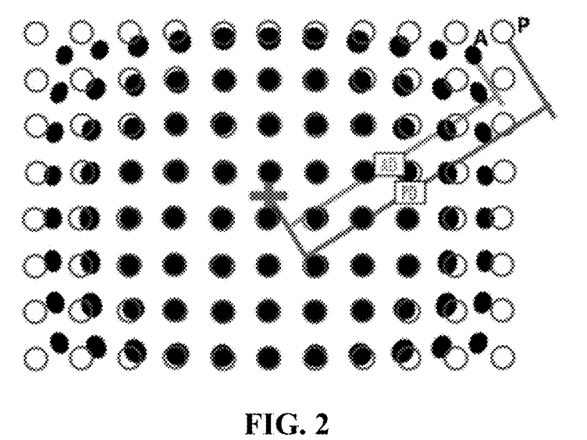
FIG. 2 is a diagram of raw pixel coordinates versus target pixel coordinates according to an illustrative embodiment.

As shown in FIG. 2, a solid dot identifies a raw pixel coordinate, and a hollow circle identifies a target pixel coordinate. The map may include the target pixel coordinate corresponding to the raw pixel coordinate of each pixel.

For example, the file format of the map is an image format. The pixel coordinate of each pixel in the image format corresponds to the raw pixel coordinate of the image collected by the image collector. The target pixel coordinate is stored in each raw pixel coordinate. Thus, when the first image is corrected to generate the second image, the map is searched for the target pixel coordinate according to the current raw pixel coordinate in the first image being traversed. The pixel coordinate of the pixel of the current raw pixel coordinate is changed to the target pixel coordinate according to the target pixel coordinate, thereby acquiring the second image.

The correspondence between the raw pixel coordinate and the target pixel coordinate pixel may be stored in the image format, facilitating storage.

In embodiments of the present disclosure, the map may be information in any format storing the correspondence between the raw pixel coordinate of each pixel collected by an image sensor and the target pixel coordinate, which is not limited to the example of the pixel map in the image format.

In short, in embodiments of the present disclosure, an image is corrected based on a map. The raw pixel coordinate of each pixel in the map corresponds to a target pixel coordinate. Therefore, the first image is corrected pixel by pixel during image correction of embodiments of the present disclosure, providing excellent correction effect. In addition, in embodiments of the present disclosure, image correction is performed based directly on the map generated by the correspondence between the distortion rate and the field of view of the image collector, is applicable to any image collected by the image collector, and therefore is of a wide application range. Meanwhile, massive complicated computation is not needed, and it suffices to perform coordinate transformation on collected pixels according to the map, with simple computation and efficient correction.

In some embodiments, the map may be generated dynamically, or may be generated in advance. If the map is generated in advance, the map generated in advance may be read directly in use, thereby saving time spent on image correction, improving image correction efficiency. Therefore, in some embodiments, S120 may be as follows. The map generated in advance based on the correspondence between the distortion rate and the field of view of the image collector may be read.

The map may be generated dynamically, or generated in advance, or generated when the image collector is put into use for the first time. A method for generating a map is provided below. The method for generating a map may be used together with the method for correcting an image as shown in FIG. 1, or may be used by itself.

Figure 3:
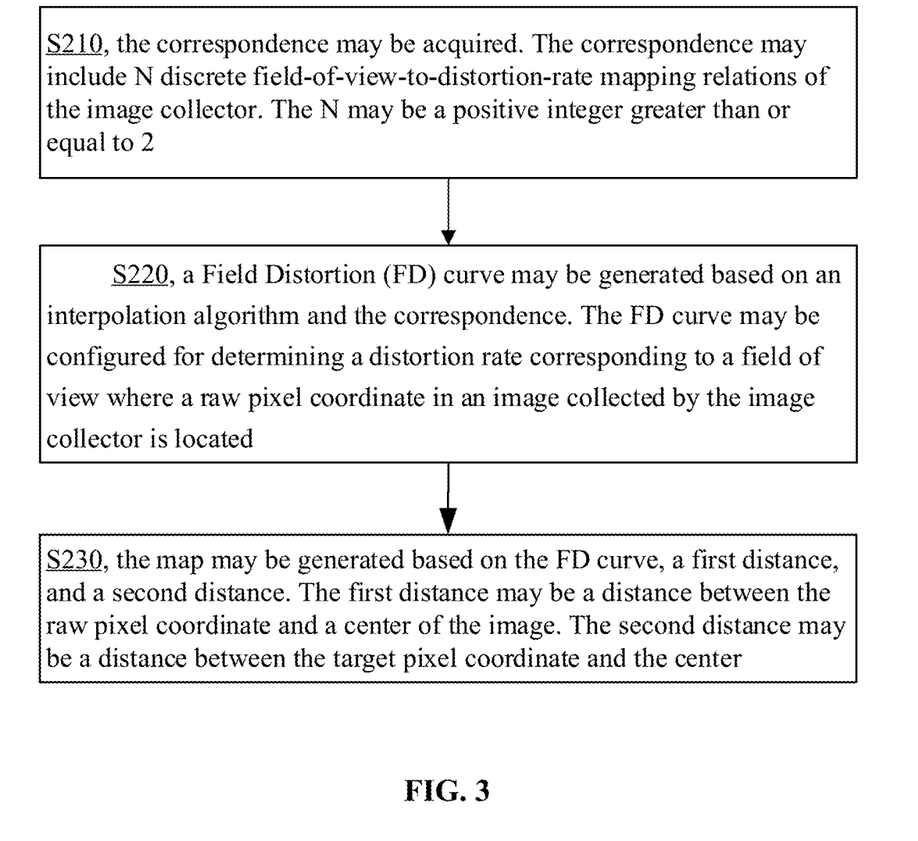
FIG. 3 is a flowchart of a method for generating a map according to an illustrative embodiment.

As shown in FIG. 3, a method for generating a map may include an option as follows.

In S210, the correspondence may be acquired. The correspondence may include N discrete field-of-view-to-distortion-rate mapping relations of the image collector. The N may be a positive integer greater than or equal to 2.

In S220, a Field Distortion (FD) curve may be generated based on an interpolation algorithm and the correspondence. The FD curve may be configured for determining a distortion rate corresponding to a field of view where a raw pixel coordinate in an image collected by the image collector is located.

In S230, the map may be generated based on the FD curve, a first distance, and a second distance. The first distance may be a distance between the raw pixel coordinate and a center of the image. The second distance may be a distance between the target pixel coordinate and the center.

The interpolation algorithm used here may include at least one of:

a linear interpolation algorithm, or a spline interpolation algorithm.

The two interpolation algorithms are simple to use and are close to the correspondence between the distortion rate and the field of view of the image sensor. Accordingly, the FD curve acquired using such an interpolation algorithm highly matches the actual situation of the image collector.

The FD curve may be generated by finding a distortion rate corresponding to each field of view corresponding to the raw pixel coordinate, therefore correcting each raw pixel coordinate on the image collector.

Referring to FIG. 1, the target pixel coordinate corresponding to each raw pixel coordinate may be computed as follows:

Distortion=(AD−PD)/PD,   formula (1).

The Distortion represents the distortion rate. The AD is the first distance between the raw pixel coordinate and the center of the image. The PD is the second distance between the target pixel coordinate that has been corrected and the center of the image.

The second distance may be computed because the distortion rate and the first distance are known.

The target pixel coordinate may be inferred according to the second distance.

In one embodiment, when a plurality of candidate pixel coordinates each with a distance to the pixel coordinate of the center equal to the second distance are acquired according to the second distance, a target pixel coordinate that is closest to the raw pixel coordinate may be selected.

Figure 4:
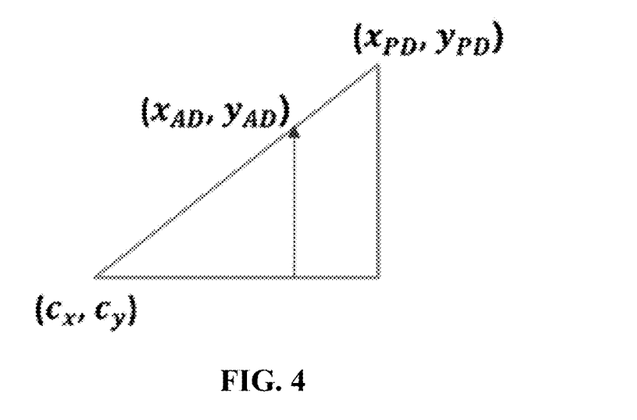
FIG. 4 is a diagram of computing a target pixel coordinate based on a principle of similar triangles according to an illustrative embodiment.

In another embodiment, a unique target pixel coordinate may be acquired based on the first distance, the second distance, the raw pixel coordinate, and the pixel coordinate of the center according to a principle of similar triangles.

In some embodiments, as shown in FIG. 4, in determining the target pixel coordinate of any raw pixel coordinate based on the principle of similar triangles, the target pixel coordinate of the any raw pixel coordinate may be acquired quickly based on formula (2) corresponding to the principle of similar triangles.

$$\frac{AD}{PD} = \frac{X_{AD} - C_X}{X_{PD} - C_X} = \frac{Y_{AD} - C_Y}{Y_{PD} - C_Y}, \quad \text{formula (2)}$$

In formula (2), the AD is the first distance, the PD is the second distance, the $(C_X, C_Y)$ is the pixel coordinate of the center, and the $(X_{AD}, Y_{AD})$ is the raw pixel coordinate, which are all known. Then, the target pixel coordinate $(X_{PD}, Y_{PD})$ of a corrected point P may be acquired.

In some other embodiments, the target pixel coordinate may be determined based on a plotting method of the principle of similar triangles.

Plotting Method 1

A first triangle is constructed based on the raw pixel coordinate, the coordinate of the center, and a coordinate axis passing through the center.

A second triangle similar to the first triangle is constructed taking the pixel coordinate of the center as a vertex of the second triangle and taking a segment of a straight line passing through the raw pixel coordinate and the center as a side of the second triangle. The vertex of the second triangle located on the straight line passing through the raw pixel coordinate and the center is the point where the target pixel coordinate is located.

Plotting Method 2

On the straight line passing through the raw pixel coordinate and the center, a line segment starting from the center with a length equal to the second distance is intercepted along the direction pointing from the center to the raw pixel coordinate, with the pixel coordinate of the point of intercept being the target pixel coordinate.

In some embodiments, S240 may include an option as follows.

The field of view of the raw pixel coordinate of the image collector may be determined.

The distortion rate of the raw pixel coordinate may be determined by searching the FD curve based on the field of view.

The target pixel coordinate corresponding to the raw pixel coordinate of the image collector may be determined based on a functional relation among the distortion rate, the first distance, and the second distance.

The map may be generated based on the raw pixel coordinate and the target pixel coordinate corresponding to the raw pixel coordinate.

In an image collected by the image collector, fields of view of different pixel coordinates are different. In embodiments of the present disclosure, the field of view of each pixel coordinate in the collected image is determined first. Then, the distortion rate of each raw pixel coordinate is determined according to a generated FD curve. The target pixel coordinate is then acquired with formula (1), so as to generate the map. That is, formula (1) is an example of a functional relation among the distortion rate, the first distance, and the second distance.

The field of view of the raw pixel coordinate of the image collector may be determined as follows.

A maximum collection radius and a pixel coordinate of a center of the image collector may be determined. A field of view of the pixel coordinate of the center may be a first preset value. The field of view of the raw pixel coordinate with a distance to the pixel coordinate of the center equal to the maximum collection radius may be a second preset value. A difference between the second preset value and the first preset value may be a field-of-view range of the image collector.

A distance between the raw pixel coordinate collected by the image collector and the pixel coordinate of the center may be determined.

A field-of-view ratio of the raw pixel coordinate may be determined according to the distance between the raw pixel coordinate and the center as well as the maximum collection radius.

The field of view of the raw pixel coordinate may be determined based on the field-of-view ratio and the field-of-view range.

Figure 5:
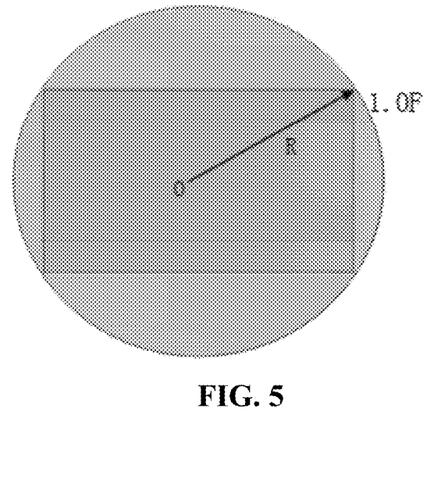
FIG. 5 is a diagram of a field of view of an image collector according to an illustrative embodiment.

In some embodiments, the maximum collection radius is computed using formula (3).

Referring to FIG. 5, a viewfinder lens of the image collector is round. An inscribed rectangle of the image collector is the maximum image size that may be collected by the image sensor. For example, the maximum image size may correspond to the image sensor of the image collector.

The maximum image size and the pixel coordinate of the center of the image may be known when the image collector leaves a factory. In view of this, the maximum collection radius may be R=sqrt((Max(X)−C(X))*(Max(X)−C(X))+(Max(Y)−C(Y))*(Max(Y)−C(Y))), formula (3).

The coordinate of the maximum image size on the X-axis may be Max(X). The maximum coordinate of the maximum image size on the Y-axis may be Max(Y). The Y-axis is perpendicular to the X-axis. The coordinate of the center of the image on the X-axis may be C(X), and the coordinate of the center of the image on the Y-axis may be C(Y). The center of the image may correspond to the location of the optical center of the image collector.

Illustratively, the image collector may include lens and an image sensor. The camera may conduct light to the image sensor. The image sensor may generate an image. Illustratively, the maximum image size may be of 4000*3000, and by default the center of the lens coincides with a physical center of the image sensor. Then, the maximum collection radius may be R=sqrt((4000−2000)*(4000−2000)+(3000−1500)*(3000−1500))=2500.

In some embodiments, the first preset value may be 0.0 F, and the second preset value may be 1.0 F. In this way, the second preset value minus the first preset value is the field-of-view range, which may be 1.0 F. The F represents the field of view.

In some embodiments, the field-of-view ratio of each raw pixel coordinate may be computed based on formula (4).

ratio=sqrt((x−2000)*(x−Cx)+(y−1500)*(y−Cy))/R, formula (4)

The (x, y) represents any raw pixel coordinate in the image. The (Cx, Cy) represents the pixel coordinate of the center of the image. The ratio represents the field-of-view ratio of the raw pixel coordinate.

In this way, the field of view of each raw pixel coordinate is field_new=ratio*1.0, formula (5). The field_new is a raw pixel coordinate.

Embodiments of the present disclosure provide a method for performing image correction based on a lens distortion coefficient of a lens.

With a general distortion model, a parameter of a camera has to be acquired using a calibration algorithm to implement distortion correction. With the method of embodiments of the present disclosure, no calibration cloth, nor calibration plate, etc., needed for a calibration algorithm and any manual intervention is necessary, and just a Field Distortion (FD) Table reflecting information on curvature of the lens provided by a lens manufacturer is needed.

A general correction method fails to solve an irregular distortion, i.e., the general correction method may fail when the distortion state of the field of view differs. With the method here, distortion correction may be performed adaptive to different fields of view.

With the method of the present disclosure, a mapping relation between a distortion domain and a correction domain can be established quickly and accurately, and distortion can be removed in real time. Taking an image of a size 2000*1500 as an example, distortion may be removed within just 20 ms using the method provided by embodiments of the present disclosure.

As shown in Table 1, Field represents different fields of view, and Distortion represents the distortion rates. FD tables of different lenses are different. Table 1 is but for reference. A computation formula is: Distortion=(Real image height−ideal image height)/ideal image height.

Generally, the center of the lens is deemed as the center of a rectangular image. As marginal areas at the four corners are actually not in the field of view and are black shadows with no information, and the actual imaging range is a circle centered on a center point, the radius of the actual imaging area may be acquired, as shown in FIG. 5.

The radius R corresponds to the 1.0 field of view. The center corresponds to the 0 field of view. Another field of view (such as 0.1 F and 0.2 F) is the ratio of the distance between a pixel in the image and the center of the image to the maximum collection radius R.

An FD curve is fitted by establishing a Cartesian coordinate system with the X-axis as Field and the Y-axis as Distortion.

Taking the image resolution 4000*3000 as an example, by default the center of the lens coincides with a physical center of the image sensor. The pixel coordinate (the coordinate, for short) of the center of the image is (2000, 1500).

The maximum collection radius R=sqrt((4000−2000)*(4000−2000)+(3000−1500)*(3000−1500))=2500 corresponds to the Field of 1.0 F and the Distortion=1.58%.

For the pixel coordinate (x, y) of any point, the field of view containing the pixel may be acquired by ratio=sqrt((x−2000)*(x−2000)+(y−1500)*(y−1500))/2500.

The field of view is denoted as field_new=ratio*1.0.

Then, Table 1 (FD Table) is searched for the Distortion k_new corresponding to the new field of view field_new.

Since only 11 pairs of discrete points may be acquired from a lens manufacturer, when computing a pixel located in the field of view of 0.35 F, no corresponding distortion can be found in the FD Table. In this case, a linear interpolation algorithm has to be used to fit an FD curve, so that a one-to-one relation between field and distortion may be found by looking up a table.

The map is generated. The map is a diagram of a mapping transform relation between a distorted image and a corrected image.

(1) A raw image is an unprocessed image that is photographed by a camera, i.e., the distorted image.

(2) A corrected image is an image generated by correcting the distortion according to the raw image.

As shown in FIG. 2, black spots in the figure may be regarded as raw pixel coordinates of pixels in the raw image undergoing no processing, and therefore with distortion, especially sever edge pixel bending, while circles in the figure may be regarded as pixel coordinates of pixel points in the corrected image after the distortion has been corrected. A "Cross" in the figure represents the center of the image. The AD represents the distance of a distorted point (point A, with the coordinate of (XAD, YAD)) to the center of the image, which is referred to as a distorted distance for short. The FD represents a distance of a corrected point (point P, with the coordinate of (XPD, YPD)) to the center of the image, which is referred to as a corrected distance for short. The relation between the AD and the PD may be computed using the Distortion mentioned in Step 1, then Distortion=(AD−PD)/PD.

In the description, when accessing any distorted pixel point (pixel point A as an example) in an unprocessed image collected by a camera, a mapping process of solving the corrected pixel point corresponding to the distorted pixel point is shown as follows.

Known parameters are as follows.
a. The distorted distance is AD.
b. The field of view Field_new where the distorted point A is located is computed by Field_new=AD/R. The R is the radius of the image.
c. The Distortion corresponding to the Field_new may be found directly according to the FD curve.
d. The PD may be computed according to Distortion= (AD−PD)/PD.
e. The coordinate (x, y) of the point P may be computed according to PD as follows.

The target pixel coordinate of the coordinate $$\frac{AD}{PD} = \frac{X_{AD} - C_X}{X_{PD} - C_X} = \frac{Y_{AD} - C_Y}{Y_{PD} - C_Y}, \quad \text{formula (2)}$$

In formula (2), the AD is the first distance, the PD is the second distance, the $(C_x, C_Y)$ is the pixel coordinate of the center, and the $(X_{AD}, Y_{AD})$ is the raw pixel coordinate, which are all known. Then, the target pixel coordinate $(X_{PD}, Y_{PD})$ of a corrected point P may be acquired.

When the entire image is traversed, the map between each distorted pixel point and its corrected point may be stored.

A corrected image may be generated in real time and output by reading the raw image and a distortion correcting map.

With the method, an image of the size 2000*1500 may be de-distorted in just 20 ms.

The method provided by embodiments of the present disclosure has the following features.

1) With a general distortion model, a parameter of a camera has to be acquired using a calibration algorithm to implement distortion correction. With the method here, no calibration cloth, nor calibration plate, etc., needed for a calibration algorithm and any manual intervention is necessary, and just a Factory FD Table provided by a lens manufacturer is needed.

2) A general correction method fails to solve an irregular distortion, i.e., the general correction method may fail when the distortion state of the field of view differs. With the method here, distortion correction may be performed adaptive to different fields of view. In addition, an experimental result shows better correction effect.

3) With the method here, a mapping relation between a distortion domain and a correction domain can be established quickly and accurately, and distortion can be removed in real time. For example, an image of a size 2000*1500 may be de-distorted within just 20 ms.

Figure 6:
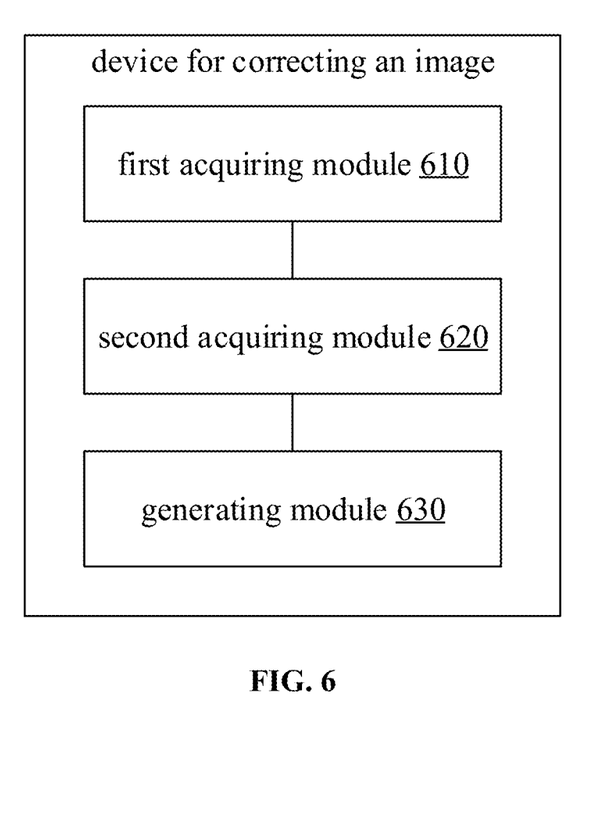
FIG. 6 is a diagram of a structure of a device for correcting an image according to an illustrative embodiment.

As shown in FIG. 6, embodiments of the present disclosure provide a device for correcting an image. The device may include a first acquiring module 610, a second acquiring module 620, and a generating module 630.

The first acquiring module 610 is configured to acquire a first image collected by an image collector.

The second acquiring module 620 is configured to acquire a map generated based on a correspondence between a distortion rate and a field of view of the image collector. The map includes a mapping relation between a raw pixel coordinate of a pixel in a raw image collected by the image collector and a target pixel coordinate that has been corrected.

The generating module 630 is configured to acquire a second image that has been corrected by correcting the first image based on the map.

In some embodiments, the first acquiring module 610, the second acquiring module 620, and the generating module 630 may include program modules. After the program modules have been executed by a processor, the function of any above-mentioned module may be implemented.

In some embodiments, the first acquiring module 610, the second acquiring module 620, and the generating module 630 may be modules combining software and hardware, including but not limited to programmable arrays. Such a programmable array may include, but is not limited to, a complex programmable array and/or a field-programmable array.

In some embodiments, the first acquiring module 610, the second acquiring module 620, and the generating module 630 may be pure hardware modules including, but not limited to, application specific integrated circuits.

In some embodiments, the second acquiring module 620 is specifically configured to read the map generated in advance based on the correspondence between the distortion rate and the field of view of the image collector.

In some embodiments, the device further includes a third acquiring module, a Field Distortion (FD) curve module, and a map module.

The third acquiring module may be configured to acquire the correspondence. The correspondence may include N discrete field-of-view-to-distortion-rate mapping relations of the image collector. The N may be a positive integer greater than or equal to 2.

The FD curve module may be configured to generate a Field Distortion (FD) curve based on an interpolation algorithm and the correspondence. The FD curve may be configured for determining a distortion rate corresponding to a field of view where a raw pixel coordinate in an image collected by the image collector is located.

The map module may be configured to generate the map based on the FD curve, a first distance, and a second distance. The first distance may be a distance between the raw pixel coordinate and a center of the image. The second distance may be a distance between the target pixel coordinate and the center.

In some embodiments, the map module is specifically configured to implement: determining the field of view of the raw pixel coordinate of the image collector; determining the distortion rate of the raw pixel coordinate by searching the FD curve based on the field of view; determining the target pixel coordinate corresponding to the raw pixel coordinate of the image collector based on a functional relation among the distortion rate, the first distance, and the second distance; and generating the map based on the raw pixel coordinate and the target pixel coordinate corresponding to the raw pixel coordinate. For example, the raw pixel coordinate of the image collector may be the raw pixel coordinate of the image sensor.

In some embodiments, the map module is specifically configured to implement: determining a maximum collection radius and a pixel coordinate of a center of the image collector, a field of view of the pixel coordinate of the center being a first preset value, a field of view of a predetermined pixel coordinate being a second preset value, the predetermined pixel coordinate being: a pixel coordinate with a distance to the pixel coordinate of the center equal to the maximum collection radius, a difference between the second preset value and the first preset value being a field-of-view range of the image collector; determining a distance between the raw pixel coordinate collected by the image collector and the pixel coordinate of the center; determining a field-of-view ratio of the raw pixel coordinate according to the distance between the raw pixel coordinate and the center as well as the maximum collection radius; and determining the field of view of the raw pixel coordinate based on the field-of-view ratio and the field-of-view range. For example, the center of the image collector may be the center of the image sensor.

Embodiments of the present disclosure provide an electronic device.

The electronic device may include a memory configured to store processor executable instructions and a processor.

The processor is connected to the memory.

The processor is configured to perform the method for correcting an image and/or the method for generating a map provided by any foregoing technical solution.

The processor may include various types of storage media, which are non-transitory computer storage media capable of continuing to memorize information stored thereon after communication equipment has been powered down.

The mobile terminal may include, but is not limited to, an electronic device, such as various mobile terminals or fixed terminals, such as a mobile phone, a tablet, or projection equipment.

The processor may be connected with the memory through a bus, etc., and is configured to read an executable program stored in the memory to implement at least one method shown in any of FIG. 1 and/or FIG. 3, for example.

Figure 7:
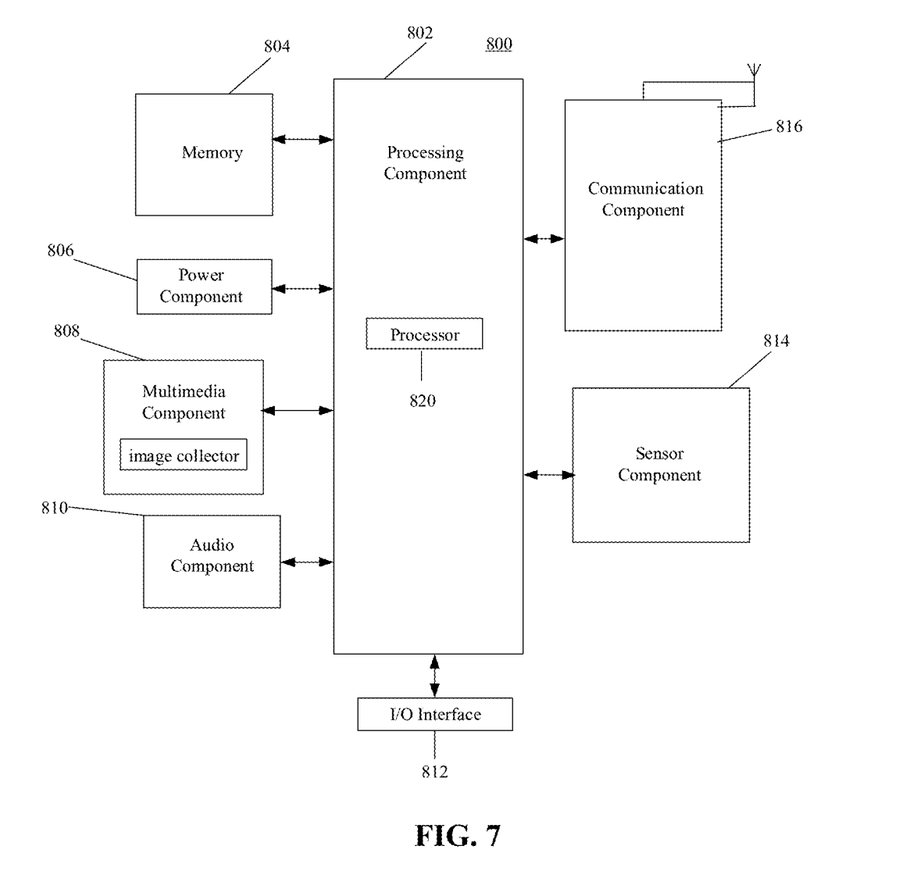
FIG. 7 is a diagram of a structure of a mobile terminal according to an illustrative embodiment.

FIG. 7 is a block diagram of a mobile terminal 800 according to an illustrative embodiment. For example, the mobile terminal 800 may be a mobile phone, a mobile computer, a digital broadcasting terminal, a message transceiver, a game console, tablet equipment, medical equipment, fitness equipment, a Personal Digital Assistant (PDA), etc.

Referring to FIG. 7, the mobile terminal 800 may include one or more components as follows: a processing component 802, a memory 804, a power component 806, a multimedia component 808, an audio component 810, an Input/Output (I/O) interface 812, a sensor component 814, and a communication component 816.

The processing component 802 generally controls an overall operation of the mobile terminal 800, such as operations associated with display, a telephone call, data communication, a camera operation, a recording operation, etc. The processing component 802 may include one or more processors 820 to execute instructions so as to complete all or some steps of the method. In addition, the processing component 802 may include one or more modules to facilitate interaction between the processing component 802 and other components. For example, the processing component 802 may include a multimedia module to facilitate interaction between the multimedia component 808 and the processing component 802.

The memory 804 is configured to store various types of data to support operation on the mobile terminal 800. Examples of these data include instructions of any application or method configured to operate on the mobile terminal 800, contact data, phonebook data, messages, images, videos, and/etc. The memory 804 may be implemented by any type of volatile or non-volatile storage equipment or combination of the volatile or non-volatile storage equipment, such as Static Random Access Memory (SRAM), Electrically Erasable Programmable Read-Only Memory (EEPROM), Erasable Programmable Read-Only Memory (EPROM), Programmable Read-Only Memory (PROM), Read-Only Memory (ROM), magnetic memory, flash memory, magnetic disk, or compact disk.

The power component 806 supplies electric power to various components of the mobile terminal 800. The power component 806 may include a power management system, one or more power supplies, and other components related to generating, managing and distributing electric power for the mobile terminal 800.

The multimedia component 808 includes a screen providing an output interface between the mobile terminal 800 and a user. The screen may include a Liquid Crystal Display (LCD) and a Touch Panel (TP). If the screen includes a TP, the screen may be implemented as a touch screen to receive an input signal from a user. The TP includes one or more touch sensors for sensing touch, slide and gestures on the TP. The touch sensors not only may sense the boundary of a touch or slide move, but also detect the duration and pressure related to the touch or slide move. In some embodiments, the multimedia component 808 includes the image collector according to the present disclosure, such as a front camera and/or a rear camera. When the mobile terminal 800 is in an operation mode such as a shooting mode or a video mode, the front camera and/or the rear camera may receive external multimedia data. Each of the front camera and/or the rear camera may be a fixed optical lens system or may have a focal length and be capable of optical zooming.

The audio component 810 is configured to output and/or input an audio signal. For example, the audio component 810 includes a microphone (MIC). When the mobile terminal 800 is in an operation mode such as a call mode, a recording mode, and a voice recognition mode, the MIC is configured to receive an external audio signal. The received audio signal may be further stored in the memory 804 or may be sent via the communication component 816. In some embodiments, the audio component 810 further includes a loudspeaker configured to output the audio signal.

The I/O interface 812 provides an interface between the processing component 802 and a peripheral interface module. The peripheral interface module may be a keypad, a click wheel, a button, etc. These buttons may include but are not limited to: a homepage button, a volume button, a start button, and a lock button.

The sensor component 814 includes one or more sensors for assessing various states of the mobile terminal 800. For example, the sensor component 814 may detect an on/off state of the mobile terminal 800 and relative location of components such as the display and the keypad of the mobile terminal 800. The sensor component 814 may further detect a change in the location of the mobile terminal 800 or of a component of the mobile terminal 800, whether there is contact between the mobile terminal 800 and a user, the orientation or acceleration/deceleration of the mobile terminal 800, and a change in the temperature of the mobile terminal 800. The sensor component 814 may include a proximity sensor configured to detect existence of a nearby object without physical contact. The sensor component 814 may further include an optical sensor such as a Complementary Metal-Oxide-Semiconductor (CMOS) or Charge-Coupled-Mobile terminal 800 (CCD) image sensor used in an imaging application.

In some embodiments, the sensor component 814 may further include an acceleration sensor, a gyroscope sensor, a magnetic sensor, a pressure sensor, or a temperature sensor.

The communication component 816 is configured to facilitate wired or wireless/radio communication between the mobile terminal 800 and other equipment. The mobile terminal 800 may access a radio network based on a communication standard such as WiFi, 2G, 3G, . . . , or a combination of the any communication standard. In an illustrative embodiment, the communication component 816 broadcasts related information or receives a broadcast signal from an external broadcast management system via a broadcast channel. In an illustrative embodiment, the communication component 816 further includes a Near Field Communication (NFC) module for short-range communication. For example, the NFC module may be implemented based on Radio Frequency Identification (RFID), Infrared Data Association (IrDA), Ultra-WideBand (UWB) technology, BlueTooth (BT) technology, and other technologies.

In an illustrative embodiment, the mobile terminal 800 may be implemented by one or more of Application Specific Integrated Circuits (ASIC), Digital Signal Processors (DSP), Digital Signal Processing Mobile terminal 800 (DSPD), Programmable Logic Mobile terminal 800s (PLD), Field Programmable Gate Arrays (FPGA), controllers, microcontrollers, microprocessors or other electronic components, to implement the method.

In an illustrative embodiment, a transitory or non-transitory computer-readable storage medium including instructions, such as the memory 804 including instructions, is further provided. The instructions may be executed by the processor 820 of the mobile terminal 800 to implement an aforementioned method. For example, the computer-readable storage medium may be a Read-Only Memory (ROM), a Random Access Memory (RAM), a Compact Disc Read-Only Memory (CD-ROM), a magnetic tape, a floppy disk, optical data storage equipment, etc.

Embodiments of the present disclosure provide a transitory or non-transitory computer-readable storage medium having stored therein instructions which, when executed by a processor of a mobile terminal, allowing the mobile terminal to execute the method for correcting an image provided by any foregoing embodiment, such as at least one method shown in any of FIG. 1 and/or FIG. 3, for example.

The method for correcting an image may include: acquiring a first image collected by an image collector; acquiring a map generated based on a correspondence between a distortion rate and a field of view of the image collector, the map including a mapping relation between a raw pixel coordinate of a pixel in a raw image collected by the image collector and a target pixel coordinate that has been corrected; and acquiring a second image that has been corrected by correcting the first image based on the map.

Understandably, acquiring the map generated based on the correspondence between the distortion rate and the field of view of the image collector may include: reading the map generated in advance based on the correspondence between the distortion rate and the field of view of the image collector.

Understandably, the map is generated by: acquiring the correspondence, the correspondence including N discrete field-of-view-to-distortion-rate mapping relations of the image collector, the N being a positive integer greater than or equal to 2; generating a Field Distortion (FD) curve based on an interpolation algorithm and the correspondence, the FD curve being configured for determining a distortion rate corresponding to a field of view where a raw pixel coordinate in an image collected by the image collector is located; and generating the map based on the FD curve, a first distance, and a second distance. The first distance may be a distance between the raw pixel coordinate and a center of the image. The second distance may be a distance between the target pixel coordinate and the center.

Understandably, generating the map based on the FD curve, the first distance, and the second distance may include: determining the field of view of the raw pixel coordinate of the image collector; determining the distortion rate of the raw pixel coordinate by searching the FD curve based on the field of view; determining the target pixel coordinate corresponding to the raw pixel coordinate of the image collector based on a functional relation among the distortion rate, the first distance, and the second distance; and generating the map based on the raw pixel coordinate and the target pixel coordinate corresponding to the raw pixel coordinate.

Understandably, determining the field of view of the raw pixel coordinate of the image collector may include: determining a maximum collection radius and a pixel coordinate of a center of the image collector, a field of view of the pixel coordinate of the center being a first preset value, a field of view of a predetermined pixel coordinate being a second preset value, the predetermined pixel coordinate being: a pixel coordinate with a distance to the pixel coordinate of the center equal to the maximum collection radius, a difference between the second preset value and the first preset value being a field-of-view range of the image collector; determining a distance between the raw pixel coordinate collected by the image collector and the pixel coordinate of the center; determining a field-of-view ratio of the raw pixel coordinate according to the distance between the raw pixel coordinate and the center as well as the maximum collection radius; and determining the field of view of the raw pixel coordinate based on the field-of-view ratio and the field-of-view range.

Other implementations of the present disclosure will be apparent to a person having ordinary skill in the art that has deemed the specification and practiced the present disclosure. The present disclosure is intended to cover any variation, use, or adaptation of the present disclosure following the general principles of the present disclosure and including such departures from the present disclosure as come within common knowledge or customary practice in the art. The specification and the embodiments are intended to be illustrative, with a true scope and spirit of the present disclosure being indicated by the appended claims.

It should be understood that the present disclosure is not limited to the exact construction that has been described above and illustrated in the accompanying drawings, and that various modifications and changes may be made to the present disclosure without departing from the scope of the present disclosure. It is intended that the scope of the present disclosure is limited by the appended claims.

With a technical solution provided by embodiments of the present disclosure, an image is corrected based on a map. As the raw pixel coordinate of each pixel in the map corresponds to a target pixel coordinate, a first image is corrected pixel by pixel, providing excellent correction effect. In addition, in embodiments of the present disclosure, the map generated based on the correspondence between the distortion rate and the field of view of an image collector is applicable to any image collected by the image collector, and therefore is of a wide application range. Meanwhile, massive complicated computation is not needed, and it suffices to perform coordinate transformation on collected pixels according to the map, with simple computation and efficient correction.

What is claimed is:

1. A method for correcting an image, comprising:
   acquiring a first image collected by an image collector;
   acquiring a map generated based on a correspondence between a distortion rate and a field of view of the image collector, the map comprising a mapping relation between a raw pixel coordinate of a pixel in a raw image collected by the image collector and a target pixel coordinate that has been corrected; and
   acquiring a second image that has been corrected by correcting the first image based on the map,
   wherein the map is generated by:
   acquiring the correspondence, the correspondence comprising N discrete field-of-view-to-distortion-rate mapping relations of the image collector, the N being a positive integer greater than or equal to 2;
   generating a Field Distortion (FD) curve based on an interpolation algorithm and the correspondence, the FD curve being configured for determining a distortion rate corresponding to a field of view where a raw pixel coordinate in an image collected by the image collector is located; and
   generating the map based on the FD curve, a first distance, and a second distance, the first distance being a distance between the raw pixel coordinate and a center of the image, the second distance being a distance between the target pixel coordinate and the center.

2. The method of claim 1, wherein acquiring the map generated based on the correspondence between the distortion rate and the field of view of the image collector comprises:
   reading the map, wherein the map is generated in advance based on the correspondence between the distortion rate and the field of view of the image collector.

3. The method of claim 1, wherein generating the map based on the FD curve, the first distance, and the second distance comprises:
   determining the field of view of the raw pixel coordinate of the image collector;
   determining the distortion rate of the raw pixel coordinate by searching the FD curve based on the field of view;
   determining the target pixel coordinate corresponding to the raw pixel coordinate of the image collector based on a functional relation among the distortion rate, the first distance, and the second distance; and
   generating the map based on the raw pixel coordinate and the target pixel coordinate corresponding to the raw pixel coordinate.

4. The method of claim 3, wherein determining the field of view of the raw pixel coordinate of the image collector comprises:
   determining a maximum collection radius and a pixel coordinate of a center of the image collector, a field of view of the pixel coordinate of the center being a first preset value, a field of view of a predetermined pixel coordinate being a second preset value, the predetermined pixel coordinate being: a pixel coordinate with a distance to the pixel coordinate of the center of the image collector equal to the maximum collection radius, a difference between the second preset value and the first preset value being a field-of-view range of the image collector;
   determining a distance between the raw pixel coordinate collected by the image collector and the pixel coordinate of the center of the image collector;
   determining a field-of-view ratio of the raw pixel coordinate according to the distance between the raw pixel coordinate and the center of the image collector as well as the maximum collection radius; and
   determining the field of view of the raw pixel coordinate based on the field-of-view ratio and the field-of-view range.

5. The method of claim 2, wherein generating the map based on the FD curve, the first distance, and the second distance comprises:
   determining the field of view of the raw pixel coordinate of the image collector;
   determining the distortion rate of the raw pixel coordinate by searching the FD curve based on the field of view;
   determining the target pixel coordinate corresponding to the raw pixel coordinate of the image collector based on a functional relation among the distortion rate, the first distance, and the second distance; and
   generating the map based on the raw pixel coordinate and the target pixel coordinate corresponding to the raw pixel coordinate.

6. The method of claim 5, wherein determining the field of view of the raw pixel coordinate of the image collector comprises:
   determining a maximum collection radius and a pixel coordinate of a center of the image collector, a field of view of the pixel coordinate of the center being a first preset value, a field of view of a predetermined pixel coordinate being a second preset value, the predetermined pixel coordinate being: a pixel coordinate with a distance to the pixel coordinate of the center of the image collector equal to the maximum collection radius, a difference between the second preset value and the first preset value being a field-of-view range of the image collector;
   determining a distance between the raw pixel coordinate collected by the image collector and the pixel coordinate of the center of the image collector;
   determining a field-of-view ratio of the raw pixel coordinate according to the distance between the raw pixel coordinate and the center of the image collector as well as the maximum collection radius; and
   determining the field of view of the raw pixel coordinate based on the field-of-view ratio and the field-of-view range.

7. Electronic device, comprising:
   a memory configured to store processor executable instructions; and
   a processor connected to the memory,
   wherein the processor is configured to perform acts comprising:
   acquiring a first image collected by an image collector;
   acquiring a map generated based on a correspondence between a distortion rate and a field of view of the image collector, the map comprising a mapping relation between a raw pixel coordinate of a pixel in a raw image collected by the image collector and a target pixel coordinate that has been corrected; and acquiring a second image that has been corrected by correcting the first image based on the map, wherein the map is generated by:

acquiring the correspondence, the correspondence comprising N discrete field-of-view-to-distortion-rate mapping relations of the image collector, the N being a positive integer greater than or equal to 2;

generating a Field Distortion (FD) curve based on an interpolation algorithm and the correspondence, the FD curve being configured for determining a distortion rate corresponding to a field of view where a raw pixel coordinate in an image collected by the image collector is located; and generating the map based on the FD curve, a first distance, and a second distance, the first distance being a distance between the raw pixel coordinate and a center of the image, the second distance being a distance between the target pixel coordinate and the center.

8. The electronic device of claim 7, wherein the processor is configured to acquire the map generated based on the correspondence between the distortion rate and the field of view of the image collector by:

reading the map, wherein the map is generated in advance based on the correspondence between the distortion rate and the field of view of the image collector.

9. The electronic device of claim 7, wherein the processor is configured to generate the map based on the FD curve, the first distance, and the second distance by:

determining the field of view of the raw pixel coordinate of the image collector;

determining the distortion rate of the raw pixel coordinate by searching the FD curve based on the field of view;

determining the target pixel coordinate corresponding to the raw pixel coordinate of the image collector based on a functional relation among the distortion rate, the first distance, and the second distance; and generating the map based on the raw pixel coordinate and the target pixel coordinate corresponding to the raw pixel coordinate.

10. The electronic device of claim 9, wherein the processor is configured to determine the field of view of the raw pixel coordinate of the image collector by:

determining a maximum collection radius and a pixel coordinate of a center of the image collector, a field of view of the pixel coordinate of the center being a first preset value, a field of view of a predetermined pixel coordinate being a second preset value, the predetermined pixel coordinate being: a pixel coordinate with a distance to the pixel coordinate of the center of the image collector equal to the maximum collection radius, a difference between the second preset value and the first preset value being a field-of-view range of the image collector;

determining a distance between the raw pixel coordinate collected by the image collector and the pixel coordinate of the center of the image collector;

determining a field-of-view ratio of the raw pixel coordinate according to the distance between the raw pixel coordinate and the center of the image collector as well as the maximum collection radius; and determining the field of view of the raw pixel coordinate based on the field-of-view ratio and the field-of-view range.

11. The electronic device of claim 8, wherein the processor is configured to generate the map based on the FD curve, the first distance, and the second distance by:

determining the field of view of the raw pixel coordinate of the image collector;

determining the distortion rate of the raw pixel coordinate by searching the FD curve based on the field of view;

determining the target pixel coordinate corresponding to the raw pixel coordinate of the image collector based on a functional relation among the distortion rate, the first distance, and the second distance; and generating the map based on the raw pixel coordinate and the target pixel coordinate corresponding to the raw pixel coordinate.

12. The electronic device of claim 11, wherein the processor is configured to determine the field of view of the raw pixel coordinate of the image collector by:

determining a maximum collection radius and a pixel coordinate of a center of the image collector, a field of view of the pixel coordinate of the center being a first preset value, a field of view of a predetermined pixel coordinate being a second preset value, the predetermined pixel coordinate being: a pixel coordinate with a distance to the pixel coordinate of the center of the image collector equal to the maximum collection radius, a difference between the second preset value and the first preset value being a field-of-view range of the image collector;

determining a distance between the raw pixel coordinate collected by the image collector and the pixel coordinate of the center of the image collector;

determining a field-of-view ratio of the raw pixel coordinate according to the distance between the raw pixel coordinate and the center of the image collector as well as the maximum collection radius; and determining the field of view of the raw pixel coordinate based on the field-of-view ratio and the field-of-view range.

13. A non-transitory computer-readable storage medium, having stored thereon instructions which when executed by a processor of a computer, allow the computer to perform:

acquiring a first image collected by an image collector;

acquiring a map generated based on a correspondence between a distortion rate and a field of view of the image collector, the map comprising a mapping relation between a raw pixel coordinate of a pixel in a raw image collected by the image collector and a target pixel coordinate that has been corrected; and acquiring a second image that has been corrected by correcting the first image based on the map, wherein the map is generated by:

acquiring the correspondence, the correspondence comprising N discrete field-of-view-to-distortion-rate mapping relations of the image collector, the N being a positive integer greater than or equal to 2;

generating a Field Distortion (FD) curve based on an interpolation algorithm and the correspondence, the FD curve being configured for determining a distortion rate corresponding to a field of view where a raw pixel coordinate in an image collected by the image collector is located; and generating the map based on the FD curve, a first distance, and a second distance, the first distance being a distance between the raw pixel coordinate and a center of the image, the second distance being a distance between the target pixel coordinate and the center.

14. The storage medium of claim 13, wherein acquiring the map generated based on the correspondence between the distortion rate and the field of view of the image collector comprises:

reading the map, wherein the map is generated in advance based on the correspondence between the distortion rate and the field of view of the image collector.

15. The storage medium of claim 13, wherein generating the map based on the FD curve, the first distance, and the second distance comprises:
   determining the field of view of the raw pixel coordinate of the image collector;
   determining the distortion rate of the raw pixel coordinate by searching the FD curve based on the field of view;
   determining the target pixel coordinate corresponding to the raw pixel coordinate of the image collector based on a functional relation among the distortion rate, the first distance, and the second distance; and
   generating the map based on the raw pixel coordinate and the target pixel coordinate corresponding to the raw pixel coordinate.

* * * * *